United States Patent [19]

Harris

[11] 4,244,120

[45] Jan. 13, 1981

[54] ACCELERATION CUEING SIMULATION DEVICE

[75] Inventor: William T. Harris, Winter Park, Fla.

[73] Assignee: The United States of America as represented by the Secretary of the Navy, Washington, D.C.

[21] Appl. No.: 47,459

[22] Filed: Jun. 11, 1979

[51] Int. Cl.³ .............................................. G09B 9/08
[52] U.S. Cl. ...................................... 434/59; 340/407
[58] Field of Search ................. 35/12 E, 12 H, 35 A; 128/68, 1.5; 340/407

[56] References Cited

U.S. PATENT DOCUMENTS

| | | | |
|---|---|---|---|
| 868,621 | 10/1907 | Zelenka | 340/407 |
| 2,118,594 | 5/1938 | Douden | 128/1.5 |
| 2,687,580 | 8/1954 | Dehmel | 35/125 |
| 3,108,268 | 10/1963 | Uttal | 340/407 |
| 3,300,878 | 1/1967 | Butcher et al. | 35/12 E |
| 3,309,795 | 3/1967 | Helmore | 35/12 E |
| 3,411,500 | 11/1968 | Gatts | 128/68 |
| 3,792,426 | 2/1974 | Ravenelle et al. | 340/407 |
| 3,802,088 | 4/1974 | Barrett et al. | 340/407 |
| 3,824,707 | 7/1974 | Ashworth et al. | 35/12 E |
| 3,848,588 | 11/1974 | Miquel | 128/1.5 |
| 4,030,207 | 6/1977 | Kron | 35/12 E |

*Primary Examiner*—Vance Y. Hum
*Attorney, Agent, or Firm*—R. S. Sciascia; R. W. Adams; D. S. Kalmbaugh

[57] ABSTRACT

An acceleration cueing simulation device is disclosed for applying sustained, as well as dynamic, acceleration forces to a trainee pilot as he operates an aircraft simulator. The acceleration cueing device comprises a pair of Helmholtz coils for generating a uniform magnetic field; an aircraft control device for generating a control data signal which is responsive to simulated flight maneuvers performed by the trainee pilot; and a computer system for producing a plurality of digital logic signals which are in response to the control data signal. The plurality of digital logic signals, when converted to analog signals, will energize a plurality of coils which are embedded in a suit and a helmet worn by the trainee pilot. When the trainee pilot is within the magnetic field generated by the Helmholtz coils, the coils embedded within the suit and the helmet provide a plurality of simulated acceleration forces which are exerted upon the trainee pilot.

21 Claims, 4 Drawing Figures

ACCELERATION CUEING SIMULATION DEVICE

BACKGROUND OF THE INVENTION

1. Field of the Invention

This invention relates generally to aircraft trainers. In particular, this invention relates to a device for applying sustained acceleration forces to a trainee pilot as he operates an aircraft simulator.

2. Description of the Prior Art

A wide variety of devices are available for simulating the acceleration forces applied to a trainee pilot as he operates an aircraft simulator. In many aircraft simulators, movement is simulated by mounting a full size replica of a cockpit on a mechanical motion base. The mechanical motion base repositions the cockpit according to algorithms which convert the solution of the equations of motion for the particular aircraft being simulated to constrained motion base positions, thus providing the trainee pilot with kinesthetic information relating to aircraft velocity and acceleration.

Motion base aircraft simulators are very effective in producing realistic acceleration forces or "cues" during the initial phase of low-level, short term acceleration. However, as the accelerations become larger in magnitude and longer in duration, the limits of the motion base aircraft simulators are approached and cue generation is greatly constrained or terminated.

Other prior art devices induce acceleration forces by reproducing the body position changes which occur during actual acceleration. However, these prior art devices suffer from such problems as seat cushion ballooning, generation of false and conflicting cues, and deterioration of cockpit realism due to the use of cumbersome extraneous hardware.

SUMMARY OF THE INVENTION

The subject invention overcomes some of the disadvantages of the prior art, including those mentioned above, in that it comprises a relatively simple aircraft training device for applying sustained acceleration forces to a trainee pilot as he operates an aircraft simulator.

The subject invention comprises a pair of Helmholtz coils for generating a uniform magnetic field over a limited region; an aircraft control device for generating a control data signal which is responsive to simulated flight maneuvers performed by the trainee pilot; and a computer system for producing a plurality of digital logic signals which are in response to the control data signal generated by the aircraft control device.

The plurality of digital logic signals are converted to analog signals by a plurality of digital-to-analog converters. The analog signals then energize a plurality of coils which are embedded in a suit and a helmet worn by the trainee pilot. When the trainee pilot is within the magnetic field generated by the Helmholtz coils, the coils, embedded within the suit and the helmet worn by the trainee pilot, provide a plurality of simulated acceleration forces, which are exerted upon the trainee pilot.

DESCRIPTION OF THE PREFERRED EMBODIMENT

Figure 1:
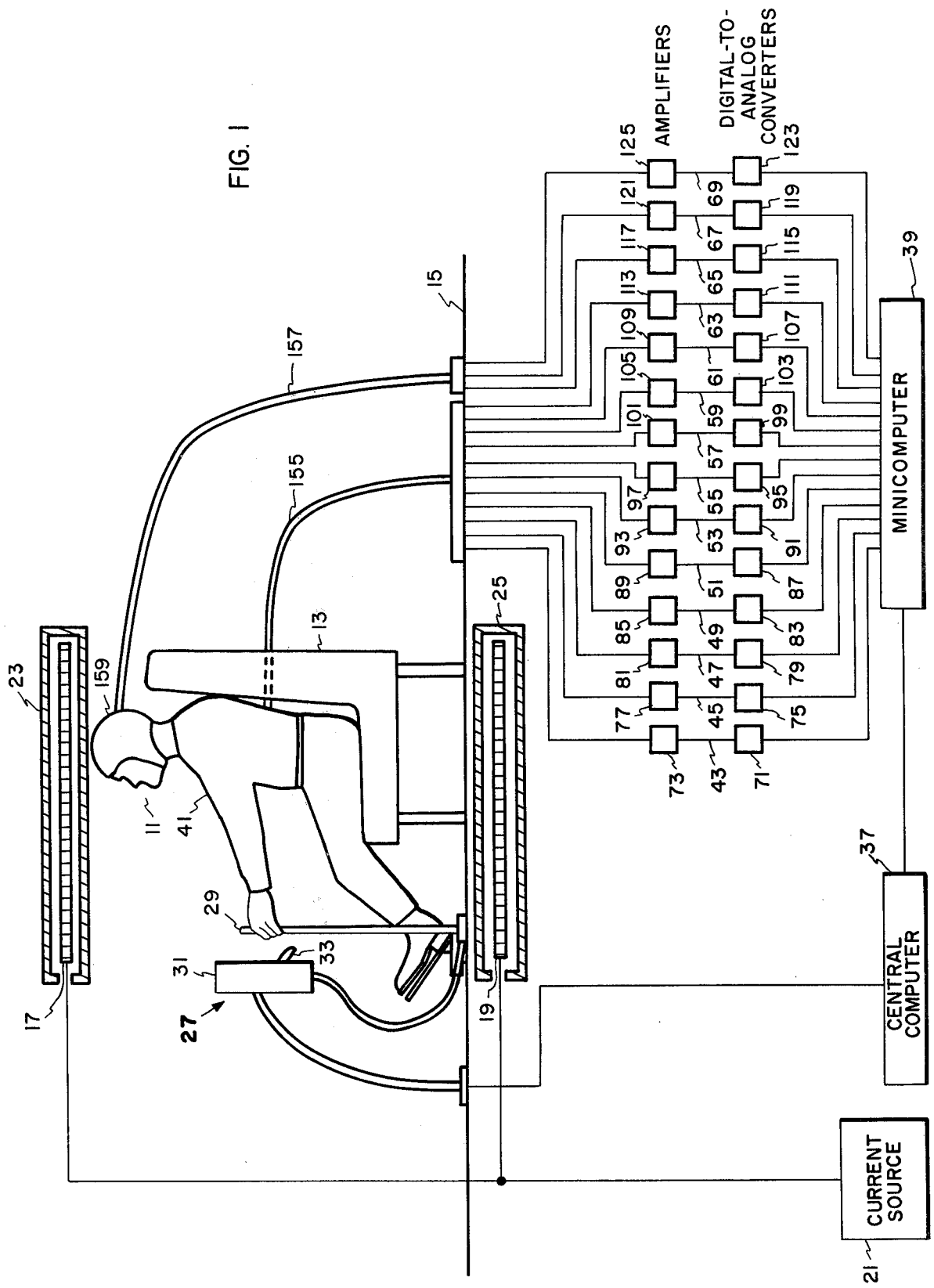
FIG. 1 is a diagrammatical representation of the subject invention.

The preferred embodiment of the subject invention will now be discussed in some detail with all of the figures of the drawings, wherein like parts are designated by like reference numerals.

Figure 2:
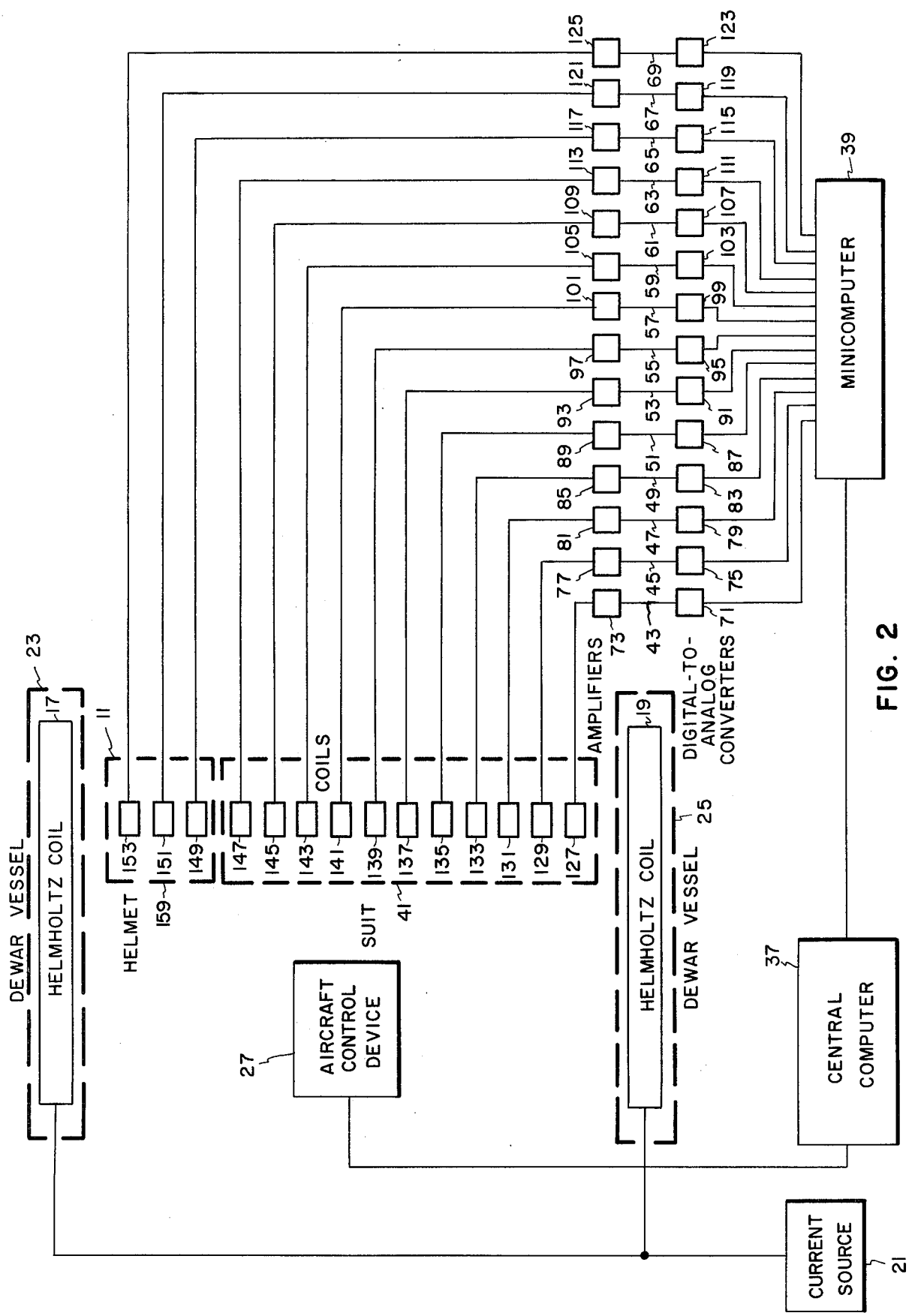
FIG. 2 is an electrical block diagram of the subject invention.

Referring to FIGS. 1 and 2, there is shown a trainee pilot 11, which may be any human trainee pilot. Trainee pilot 11 is schematically depicted as occupying a chair 13 which is rigidly attached to a floor board 15.

Spatially disposed in a horizontal plane above trainee pilot 11 is a first Helmholtz coil 17, the input of which is connected to the output of a current source 21. Spatially disposed in a horizontal plane below trainee pilot 11 is a second Helmholtz coil 19, the input of which is also connected to the output of current source 21. A first Dewar vessel 23 encloses Helmholtz coil 17, and a second Dewar vessel 25 encloses Helmholtz coil 19.

Disposed in front of trainee pilot 11 and attached to floor board 15 is an aircraft control device 27. Aircraft control device 27 comprises a joy stick 29 and an instrument panel 31 which includes an engine throttle control 33.

At this time it is to be noted that Helmholtz coils 17 and 19, Dewar vessels 23 and 25, and aircraft control device 27, all integral components of the subject invention, are well known, conventional, and commercially available.

The output of aircraft control device 27 is connected to the input of a central computer 37, the output of which is connected to a minicomputer 39.

Central computer 37 may be any conventional and commercially available digital computer. In particular, it has been found that a digital computer, Model SEL-3255, manufactured by Systems Engineering Labs. of Fort Lauderdale, Fla., performs quite satisfactorily as central computer 37. Similarly, minicomputer 39 may be any well known, conventional, and commercially available minicomputer. Further, it is important to note central computer 37 and minicomputer 39 may be replaced by a digital computer which is programmed to perform the analytical functions of central computer 37 and minicomputer 39.

The fourteen outputs of minicomputer 39 are connected to the inputs of fourteen output channels, herewith referenced by reference numerals 43, 45, 47, 49, 51, 53, 55, 57, 59, 61, 63, 65, 67, and 69, respectively.

The first output of minicomputer 39 is connected to the input of a digital-to-analog converter 71, the output of which is connected to a power amplifier 73, and as may readily be seen, the latter two elements constitute output channel 43 of the invention.

The second output of minicomputer 39 is connected to the input of a digital-to-analog converter 75, the output of which is connected to a power amplifier 77. Again, the latter two elements constitute output channel 45 of the invention.

The third output of minicomputer 39 is connected to the input of a digital-to-analog converter 79, the output of which is connected to a power amplifier 81, with the latter two elements constituting output channel 47 of the invention.

The fourth output of minicomputer 39 is connected to the input of a digital-to-analog converter 83, the output of which is connected to a power amplifier 85. Similarly, the latter two elements constitute output channel 49 of the invention.

The fifth output of minicomputer 39 is connected to the input of a digital-to-analog converter 87, the output of which is connected to the input of a power amplifier 89. Thus, the latter two elements constitute output channel 51 of the invention.

The sixth output of minicomputer 39 is connected to the input of a digital-to-analog converter 91, the output of which is connected to the input of a power amplifier 93, with the latter two elements constituting output channel 53 of the invention.

The seventh output of minicomputer 39 is connected to the input of a digital-to-analog converter 95, the output of which is connected to the input of a power amplifier 97. Again, the latter two elements constitute output channel 55 of the invention.

The eighth output of minicomputer 39 is connected to the input of a digital-to-analog converter 99, the output of which is connected to the input of a power amplifier 101. Thus, the latter two elements constitute output channel 57 of the invention.

The ninth output of minicomputer 39 is connected to the input of a digital-to-analog converter 103, the output of which is connected to the input of a power amplifier 105, with the latter two elements constituting output channel 59 of the invention.

The tenth output of minicomputer 39 is connected to the input of a digital-to-analog converter 107, the output of which is connected to the input of a power amplifier 109. Again, the latter two elements constitute output channel 61 of the invention.

The eleventh output of minicomputer 39 is connected to the input of a digital-to-analog converter 111, the output of which is connected to the input of a power amplifier 113. Similarly, the latter two elements constitute output channel 63 of the invention.

The twelfth output of minicomputer 39 is connected to the input of a digital-to-analog converter 115, the output of which is connected to the input of a power amplifier 117, with the latter two elements constituting output channel 65 of the invention.

The thirteenth output of minicomputer 39 is connected to the input of a digital-to-analog converter 119, the output of which is connected to the input of a power amplifier 121. Again, the latter two elements constitute output channel 67 of the invention.

The fourteenth output of minicomputer 39 is connected to the input of a digital-to-analog converter 123, the output of which is connected to the input of a power amplifier 125. Thus, the latter two elements constitute output channel 69 of the invention.

Figures 3, 4:
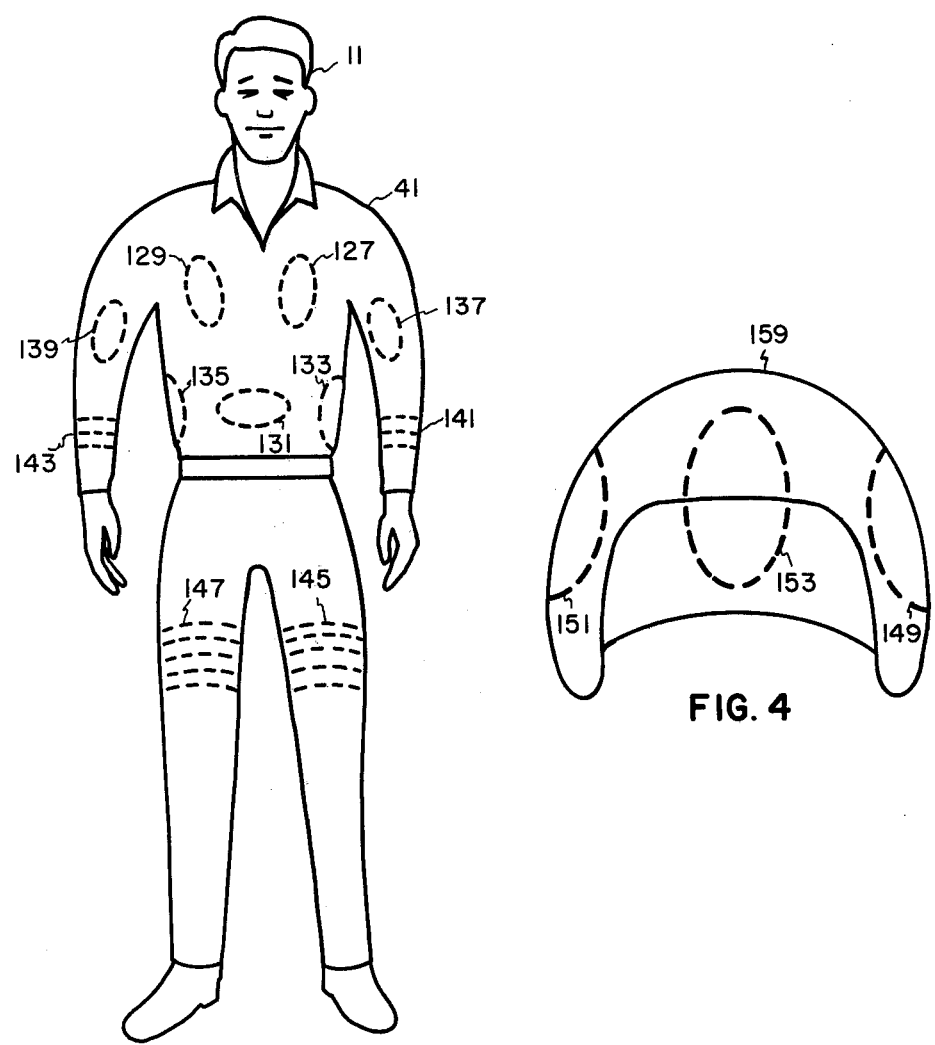
FIG. 3 is a pictorial representation of the suit worn by the trainee pilot of FIG. 1.
FIG. 4 is a pictorial representation of the helmet worn by the trainee pilot of FIG. 1.

Referring now to FIGS. 1, 2, and 3, there is shown a suit 41 adapted to be worn upon the body of trainee pilot 11. Suit 41 may be either a jump suit or a flight jacket and trousers. Embedded within suit 41 are eleven coils herewith defined as coils 127, 129, 131, 133, 135, 137, 139, 141, 143, 145, and 147. The outputs of amplifiers 73, 77, 81, 85, 89, 93, 97, 101, 105, 109, and 113 are respectively connected to the inputs of the aforementioned coils 127, 129, 131, 133, 135, 137, 139, 141, 143, 145, and 147 by a cable 155.

Coil 127 is located adjacent to the left breast of trainee pilot 11, coil 129 is located adjacent to the right breast of trainee pilot 11, coil 131 is positioned adjacent to the abdomen of trainee pilot 11, coil 133 is positioned adjacent to the left kidney of trainee pilot 11, and coil 135 is positioned adjacent to the right kidney of trainee pilot 11. Similarly, coil 137 is located adjacent to the bicep of the left arm of trainee pilot 11, coil 139 is located adjacent to the bicep of the right arm of trainee pilot 11, coil 141 encircles the left forearm of trainee pilot 11, and coil 143 encircles the right forearm of trainee pilot 11. In addition, coil 145 encircles the thigh of the left leg of trainee pilot 11, and coil 147 encircles the thigh of the right leg of trainee pilot 11.

Referring now to FIGS. 1, 2, and 4, there is shown a helmet 159, of conventional design, adapted to be worn upon the head of trainee pilot 11. Embedded within helmet 159 are three coils herewith defined as being coils 149, 151, and 153. The output of amplifiers 117, 121, and 125 are respectively connected to the inputs of the aforementioned coils 149, 151, and 153.

Coil 149 is positioned adjacent to the left ear of trainee pilot 11, coil 151 is positioned adjacent to the right ear of trainee pilot 11, and coil 153 is positioned adjacent to the back of the head of trainee pilot 11.

At this time it should be noted that all the elements which make up the subject invention, except those elements for which model numbers have been recommended, are well known, conventional, and commercially available.

The operation of the invention will now be discussed in detail in conjunction with all of the figures of the drawings.

Referring to FIGS. 1, 2, and 3, current source 21 generates a direct current voltage which energizes Helmholtz coils 17 and 19. When energized, Helmholtz coils 17 and 19 produce a uniform magnetic field over a limited region having a magnetic flux density B, which is a vector quantity expressed by the equation:

$$B = \frac{8 \mu_o NI}{\sqrt{125}\ r_1} \qquad (1)$$

where $\mu_o$ is the permeability of free space, N is the number of turns on each Helmholtz coil, I is the current drawn by either Helmholtz coil 17 or Helmholtz coil 19, and $r_1$ is the distance between Helmholtz coils 17 and 19.

Dewar vessel 23 supercools Helmholtz coil 17, and Dewar vessel 25 supercools Helmholtz coil 19. The supercooling of Helmholtz coils 17 and 19 greatly reduces the amount of power necessary to produce the uniform magnetic field, thus significantly increasing the efficiency of Helmholtz coils 17 and 19. Liquid nitrogen, which has a boiling point of minus 320.4 degrees Fahrenheit, was found to be acceptable as a supercoolant for Dewar vessels 23 and 25, although other gases, which have been liquified, would be equally acceptable as supercoolants for Dewar vessels 23 and 25.

Aircraft controls 27 generate a control data signal which is responsive to a series of simulated flight maneuvers performed by trainee pilot 11. The control data signal is then supplied to the input of central computer 37. Central computer 37, in turn, processes the control data signal according to a flight simulation program which solves the equations of motion for an aircraft, not shown, being simulated by the subject invention. Central computer 37 will then calculate, according to the flight simulation program, the appropriate changes in altitude, heading, and airspeed of the aircraft, not shown, being simulated by the subject invention based upon the particular flight maneuver performed by trainee pilot 11. Central computer 37 also supplies to the input of minicomputer 39 a suitable logic signal which is in response to the calculations performed by the flight simulation program.

Minicomputer 39, which is programmed with an acceleration cueing program, processes the logic signal provided by central computer 37. Minicomputer 39 will then compute, according to the acceleration cueing program, the acceleration forces to be applied to trainee pilot 11 based upon the particular flight maneuver performed by trainee pilot 11. Minicomputer 39 also produces fourteen digital logic signals which are in response to the acceleration forces computed by the acceleration cueing program.

Because output channels 43, 45, 47, 49, 51, 53, 55, 57, 59, 61, 63, 65, 67, and 69, and the associated coils 127, 129, 131, 133, 135, 137, 139, 141, 143, 145, 147, 149, 151, and 153 operate in exactly the same manner, for the sake of keeping this disclosure as simple as possible, only one thereof will be discussed in detail.

The digital logic signal produced at the first output of minicomputer 39, based upon the particular flight maneuver performed by trainee pilot 11, is converted to an analog control signal by digital-to-analog converter 71 of output channel 43.

The analog control signal is then amplified by amplifier 73 of output channel 43 before it energizes coil 127 which, as previously discussed, is located adjacent to the left breast of trainee pilot 11.

When coil 127 is energized, a torque T will be applied to coil 127. This torque T may be expressed by the relationship $$T = NBAI \sin \theta, \quad (2)$$

where N is the number of turns of coil 127; B is the magnetic flux density, defined by equation one above, of the uniform magnetic field produced by Helmholtz coils 17 and 19; A is the area of coil 127; I is the amount of current flowing in coil 127; and $\theta$ is the angle between the vector B and a vector which is normal to the plane of coil 127. Thus, torque T will exert a rotational force upon coil 127, thereby simulating, based upon the particular flight maneuver performed by trainee pilot 11, the acceleration force exerted upon the left breast of trainee pilot 11.

At this time it is to be noted that the subject invention is able to provide trainee pilot 11 with sustained acceleration forces as well as dynamic acceleration forces. Thus, the subject invention is a significant improvement over prior art aircraft simulators, since prior art aircraft simulators generally provide a trainee pilot with only dynamic acceleration forces.

Referring now to FIGS. 1, 2, 3, and 4, an example of the operation of the subject invention will be discussed. If trainee pilot 11, by manipulating aircraft controls 27, causes the simulated aircraft, not shown, to accelerate in the X direction, central computer 37 will calculate the appropriate changes in altitude, heading, and air speed. Minicomputer 39 will, according to the acceleration cueing program, process these changes, compute the appropriate acceleration forces, and produce at the first, second, third, sixth, seventh, and fourteenth outputs of minicomputer 39 the associated digital logic signals. The digital logic signals will be converted to analog signals by digital-to-analog converters 71, 75, 79, 91, 95, and 123; and the analog signal will, in turn, energize coils 127, 129, 131, 137, 139, and 153. Coils 127, 129, 131, 137, 139, and 153, when energized, will simulate the acceleration forces applied to the left breast, the right breast, the abdomen, the bicep of the left arm, the bicep of the right arm, and the back of the head of trainee pilot 11.

From the foregoing, it may readily be seen that the subject invention comprises a new, unique, and exceedingly useful aircraft simulator which constitutes considerable improvement over the known prior art. Obviously, many modifications and variations of the present invention are possible in light of the above teachings. It is, therefore, to be understood that within the scope of the appended claims, the invention may be practiced otherwise than as specifically described.

What is claimed is:

1. A device for applying simulated acceleration forces to a trainee pilot, comprising in combination:

current source means having an output for generating a direct current voltage;

Helmholtz coil means, having an input effectively connected to the output of said current source means for producing a uniform magnetic field over a predetermined region;

control means, positioned within the uniform magnetic field produced by said Helmholtz coil means, for generating a control data signal which is responsive to a series of simulated flight maneuvers performed by a trainee pilot, said trainee pilot being positioned within the uniform magnetic field produced by said Helmholtz coil means adjacent to said control means;

a suit adapted to be worn upon the body of said trainee pilot;

a helmet adapted to be worn upon the head of said trainee pilot;

first computer means having an input effectively connected to the output of said control means, and an output for processing the control data signal generated by said control means according to a flight simulation program, and for producing a logic signal which is in response to the processing of said control data signal by said flight simulation program;

second computer means having an input effectively connected to the output of said first computer means, and a plurality of outputs for processing the logic signal produced by said first computer means according to an acceleration cueing program, and for producing a plurality of digital logic signals which are in response to the processing of said logic signal by said acceleration cueing program;

a plurality of converter means effectively and respectively connected to the plurality of outputs of said second computer means for changing the plurality of digital logic signals provided by said second computer means to a plurality of analog control signals, and for amplifying said plurality of analog control signals; and a plurality of coil means effectively and respectively connected to the outputs of said plurality of converter means, with three thereof embedded within said helmet, and the remainder thereof embedded within said suit for applying a plurality of simulated acceleration forces to said trainee pilot with each of said simulated acceleration forces being in response to the product of said uniform magnetic field and one of said plurality of analog control signals.

2. A device for applying simulated acceleration forces to a trainee pilot according to claim 1, wherein said Helmholtz coil means comprises:
   a first Helmholtz coil spatially disposed above said trainee pilot, said first Helmholtz coil having an input effectively connected to the output of said current source means; and
   a second Helmholtz coil spatially disposed below said trainee pilot, said second Helmholtz coil having an input effectively connected to the output of said current source means.

3. A device for applying simulated acceleration forces to a trainee pilot according to claim 1, further characterized by means enclosing said Helmholtz coil means for supercooling with a coolant said Helmholtz coil means.

4. A device for applying simulated acceleration forces to a trainee pilot according to claim 3, wherein said means for supercooling with a coolant said Helmholtz coil means comprises a pair of Dewar vessels.

5. A device for applying simulated acceleration forces to a trainee pilot according to claim 3, wherein said coolant comprises liquid nitrogen.

6. A device for applying simulated acceleration forces to a trainee pilot according to claim 1, further characterized by a chair positioned within the uniform magnetic field produced by said Helmholtz coil means, said chair to be occupied by said trainee pilot.

7. A device for applying simulated acceleration forces to a trainee pilot according to claim 1, wherein said control means comprises an aircraft control device.

8. A device for applying simulated acceleration forces to a trainee pilot according to claim 1, wherein said suit comprises a jump suit.

9. A device for applying simulated acceleration forces to a trainee pilot according to claim 1, wherein said suit comprises:
   a flight jacket to be worn upon the upper body portion of said trainee pilot; and
   a trousers to be worn upon the lower body portion of said trainee pilot.

10. A device for applying simulated acceleration forces to a trainee pilot according to claim 1, wherein said first computer means comprises a digital computer.

11. A device for applying simulated acceleration forces to a trainee pilot according to claim 1, wherein said second computer means comprises a minicomputer.

12. A device for applying simulated acceleration forces to a trainee pilot according to claim 1, wherein said plurality of converter means comprises:
   a plurality of digital-to-analog converters effectively and respectively connected to the plurality of outputs of said second computer means; and
   a plurality of amplifiers effectively and respectively connected to the outputs of said plurality of digital-to-analog converters.

13. A device for applying simulated acceleration forces to a trainee pilot according to claim 1, wherein said plurality of coil means comprises:
   a first coil embedded within said suit adjacent to the left breast of said trainee pilot, said first coil having an input effectively connected to the output of the first converter means of said plurality of converter means;
   a second coil embedded within said suit adjacent to the right breast of said trainee pilot, said second coil having an input effectively connected to the output of the second converter means of said plurality of converter means;
   a third coil embedded within said suit adjacent to the abdomen of said trainee pilot, said third coil having an input effectively connected to the output of the third converter means of said plurality of converter means;
   a fourth coil embedded within said suit adjacent to the left kidney of said trainee pilot, said fourth coil having an input effectively connected to the output of the fourth converter means of said plurality of converter means;
   a fifth coil embedded within said suit adjacent to the right kidney of said trainee pilot, said fifth coil having an input effectively connected to the output of the fifth converter means of said plurality of converter means;
   a sixth coil embedded within said suit adjacent to the bicep of the left arm of said trainee pilot, said sixth coil having an input effectively connected to the output of the sixth converter means of said plurality of converter means;
   a seventh coil embedded within said suit adjacent to the bicep of the right arm of said trainee pilot, said seventh coil having an input effectively connected to the output of the seventh converter means of said plurality of converter means;
   an eighth coil embedded within said suit encircling the left forearm of said trainee pilot, said eighth coil having an input effectively connected to the output of the eighth converter means of said plurality of converter means;
   a ninth coil embedded within said suit encircling the right forearm of said trainee pilot, said ninth coil having an input effectively connected to the output of the ninth converter means of said plurality of converter means;
   a tenth coil embedded within said suit encircling the thigh of the left leg of said trainee pilot, said tenth coil having an input effectively connected to the output of the tenth converter means of said plurality of converter means;
   an eleventh coil embedded within said suit encircling the thigh of the right leg of said trainee pilot, said eleventh coil having an input effectively connected to the output of the eleventh converter means of said plurality of converter means;
   a twelfth coil embedded within said helmet adjacent to the left ear of said trainee pilot, said twelfth coil having an input connected to the output of the twelfth converter means of said plurality of converter means;
   a thirteenth coil embedded within said helmet adjacent to the right ear of said trainee pilot, said thirteenth coil having an input connected to the output of the thirteenth converter means of said plurality of converter means; and
   a fourteenth coil embedded within said helmet adjacent to the back of the head of said trainee pilot, said fourteenth coil having an input connected to the output of the fourteenth converter means of said plurality of converter means.

14. An acceleration cueing simulation device, comprising in combination:
   a current source having an output for generating a direct current voltage;

a pair of Helmholtz coils connected to the output of said current source for producing a uniform magnetic field over a predetermined region, with one thereof spatially disposed above a trainee pilot, and with the other thereof spatially disposed below said trainee pilot;

a suit adapted to be worn upon the body of said trainee pilot;

a helmet adapted to be worn upon the head of said trainee pilot;

an aircraft control device spatially disposed in front of said trainee pilot and having an output for generating a control data signal which is responsive to a series of simulated flight maneuvers performed by said trainee pilot;

a central computer having an input effectively connected to the output of said aircraft control device and an output for processing the control data signal generated by said aircraft control device according to a flight simulation program, and for producing a logic signal which is in response to the processing of said control data signal by said flight simulation program;

a minicomputer having an input effectively connected to the output of said central computer and a plurality of outputs for processing the logic signal produced by said central computer according to an acceleration cueing program, and for producing a plurality of digital logic signals which are in response to the processing of said logic signal by said acceleration cueing program;

a plurality of digital-to-analog converters effectively and respectively connected to the plurality of outputs of said minicomputer for converting the plurality of digital logic signals provided by said minicomputer to a plurality of analog control signals;

a plurality of amplifiers effectively and respectively connected to the outputs of said plurality of digital-to-analog converters; and a plurality of coils effectively and respectively connected to the outputs of said plurality of amplifiers, with three thereof embedded within said helmet, and the remainder thereof embedded within said suit for applying a plurality of simulated acceleration forces to said trainee pilot, with each of said simulated acceleration forces being in response to the product of said uniform magnetic field and one of said plurality of analog control signals.

15. An acceleration cueing device according to claim 14, further characterized by a pair of Dewar vessels for supercooling with a coolant said Helmholtz coils, with one thereof enclosing said Helmholtz coil spatially disposed above said trainee pilot, and the other thereof enclosing said Helmholtz coil spatially disposed below said trainee pilot.

16. An acceleration cueing device according to claim 15, wherein said coolant comprises liquid nitrogen.

17. An acceleration cueing device according to claim 14, further characterized by a chair located between said pair of Helmholtz coils, with said chair to be occupied by said trainee pilot.

18. An acceleration cueing device according to claim 14, wherein said suit comprises a jump suit.

19. An acceleration cueing device according to claim 14, wherein said suit comprises:

a flight jacket to be worn upon the upper body portion of said trainee pilot; and a trousers to be worn upon the lower body portion of said trainee pilot.

20. An acceleration cueing device according to claim 14, wherein said central computer comprises a digital computer.

21. An acceleration cueing device according to claim 14, wherein said plurality of coils comprises:

a first coil embedded within said suit adjacent to the left breast of said trainee pilot, said first coil having an input effectively connected to the output of the first amplifier of said plurality of amplifiers;

a second coil embedded within said suit adjacent to the right breast of said trainee pilot, said second coil having an input connected to the output of the second amplifier of said plurality of amplifiers.

a third coil embedded within said suit adjacent to the abdomen of said trainee pilot, said third coil having an input connected to the output of the third amplifier of said plurality of amplifiers;

a fourth coil embedded within said suit adjacent to the left kidney of said trainee pilot, said fourth coil having an input effectively connected to the output of the fourth amplifier of said plurality of amplifiers;

a fifth coil embedded within said suit adjacent to the right kidney of said trainee pilot, said fifth coil having an input connected to the output of the fifth amplifier of said plurality of amplifiers;

a sixth coil embedded within said suit adjacent to the bicep of the left arm of said trainee pilot, said sixth coil having an input connected to the output of the sixth amplifier of said plurality of amplifiers;

a seventh coil embedded within said suit adjacent to the bicep of the right arm of said trainee pilot, said seventh coil having an input connected to the output of the seventh amplifier of said plurality of amplifiers;

an eighth coil embedded within said suit encircling the left forearm of said trainee pilot, said eighth coil having an input effectively connected to the output of the eighth amplifier of said plurality of amplifiers;

a ninth coil embedded within said suit encircling the right forearm of said trainee pilot, said ninth coil having an input effectively connected to the output of the ninth amplifier of said plurality of amplifiers;

a tenth coil embedded within said suit encircling the thigh of the left leg of said trainee pilot, said tenth coil having an input connected to the output of the tenth amplifier of said plurality of amplifiers;

an eleventh coil embedded within said suit encircling the thigh of the right leg of said trainee pilot, said eleventh coil having an input connected to the output of the eleventh amplifier of said plurality of amplifiers;

a twelfth coil embedded within said helmet adjacent to the left ear of said trainee pilot, said twelfth coil having an input effectively connected to the output of the twelfth amplifier of said plurality of amplifiers;

a thirteenth coil embedded within said helmet adjacent to the right ear of said trainee pilot, said thirteenth coil having an input effectively connected to the output of the thirteenth amplifier of said plurality of amplifiers; and a fourteenth coil embedded within said helmet adjacent to the back of the head of said trainee pilot, said fourteenth coil having an input connected to the output of the fourteenth amplifier of said plurality of amplifiers.

* * * * *